(12) United States Patent
Milne et al.

(10) Patent No.: US 9,900,748 B2
(45) Date of Patent: Feb. 20, 2018

(54) CONSUMER ELECTRONICS (CE) DEVICE AND RELATED METHOD FOR PROVIDING STADIUM SERVICES

(71) Applicant: Sony Corporation, Tokyo (JP)

(72) Inventors: James R. Milne, Ramona, CA (US); Gregory Peter Carlsson, Santee, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 598 days.

(21) Appl. No.: 14/332,849

(22) Filed: Jul. 16, 2014

(65) Prior Publication Data

US 2016/0021510 A1    Jan. 21, 2016

(51) Int. Cl.
*G06Q 30/00* (2012.01)
*H04W 4/04* (2009.01)
*G06Q 30/06* (2012.01)
*H04W 84/18* (2009.01)

(52) U.S. Cl.
CPC .......... *H04W 4/04* (2013.01); *G06Q 30/0635* (2013.01); *G06Q 30/0639* (2013.01); *H04W 84/18* (2013.01)

(58) Field of Classification Search
CPC .......... G06Q 30/06; G06Q 30/0601–30/0643; G06Q 30/08
See application file for complete search history.

(56) References Cited

U.S. PATENT DOCUMENTS

| | | |
|---|---|---|
| 3,985,357 A | 10/1976 | Miller |
| 4,123,511 A | 10/1978 | Heintze |
| 4,301,207 A | 11/1981 | Schomerus |
| 4,340,053 A | 7/1982 | Sarui |
| 4,463,949 A | 8/1984 | McCoy, Sr. et al. |
| 4,625,336 A | 12/1986 | Derderian |
| 4,962,935 A | 10/1990 | Williams |
| 4,992,003 A | 2/1991 | Perach |
| 5,154,266 A | 10/1992 | Bieber et al. |
| 5,201,075 A | 4/1993 | Svetich |
| 5,219,316 A | 6/1993 | Huffman |
| 5,413,328 A | 5/1995 | Glancey et al. |
| 5,639,243 A | 6/1997 | Ryan et al. |

(Continued)

FOREIGN PATENT DOCUMENTS

| | | |
|---|---|---|
| CN | 101783931 A | 7/2010 |
| JP | 2004233269 | 8/2004 |

(Continued)

OTHER PUBLICATIONS

New app looks to give smartphone owners the ability to text without service or Internet Published Apr. 3, 2014 Associated Press (Year: 2014).*

(Continued)

*Primary Examiner* — William J Allen
(74) *Attorney, Agent, or Firm* — John L. Rogitz

(57) ABSTRACT

Mesh node modules are associated with stadium seats and companion nodes such as fan CE devices can dynamically form a mesh network which uploads information of the nodes to a network. Sporting information may be downloaded to a fan's CE device or services provided to the fan while in a seat based on information sent through the node modules in the stadium.

16 Claims, 3 Drawing Sheets

(56) References Cited

U.S. PATENT DOCUMENTS

| | | | |
|---|---|---|---|
| 5,742,521 A * | 4/1998 | Ellenby | G01C 17/34 702/127 |
| 5,755,405 A | 5/1998 | Socha et al. | |
| 5,927,233 A | 7/1999 | Mainini et al. | |
| 6,401,250 B1 | 6/2002 | McNabb | |
| 6,438,755 B1 | 8/2002 | MacDonald et al. | |
| 6,588,840 B1 | 7/2003 | Lombardo | |
| 6,742,636 B2 | 6/2004 | Godshaw | |
| 6,810,831 B1 | 11/2004 | Opfel | |
| 6,816,460 B1 | 11/2004 | Ahmed et al. | |
| 6,910,447 B1 | 6/2005 | Azarian | |
| 6,946,817 B2 | 9/2005 | Fischer et al. | |
| 7,323,981 B2 | 1/2008 | Peel et al. | |
| 7,328,671 B2 | 2/2008 | Kates | |
| 7,416,123 B2 | 8/2008 | Saperstein et al. | |
| 7,438,356 B2 | 10/2008 | Howman et al. | |
| 7,451,927 B2 | 11/2008 | Saperstein et al. | |
| 7,626,966 B1 | 12/2009 | Ruiter et al. | |
| 7,714,708 B2 | 5/2010 | Brackmann et al. | |
| 7,753,826 B1 | 7/2010 | Oliver et al. | |
| 7,768,150 B2 | 8/2010 | Platania et al. | |
| 7,770,539 B1 | 8/2010 | Zimmerman et al. | |
| 7,818,820 B2 | 10/2010 | Tsujimoto | |
| 7,916,025 B2 | 3/2011 | Locker et al. | |
| 7,962,186 B2 | 6/2011 | Cui et al. | |
| 8,126,782 B1 | 2/2012 | Zhu et al. | |
| 8,149,748 B2 | 4/2012 | Bata et al. | |
| 8,233,846 B2 | 7/2012 | Rofougaran | |
| 8,253,557 B2 | 8/2012 | Ani et al. | |
| 8,366,570 B1 | 2/2013 | DeMarco et al. | |
| 8,526,970 B2 | 9/2013 | Wala et al. | |
| 8,568,191 B2 | 10/2013 | Rehkemper et al. | |
| 8,583,182 B2 | 11/2013 | Piirainen et al. | |
| 8,609,454 B2 | 12/2013 | Dai et al. | |
| 8,624,743 B2 | 1/2014 | Langer et al. | |
| 8,719,001 B1 | 5/2014 | Izdepski et al. | |
| 8,878,671 B2 | 11/2014 | Buchheim et al. | |
| 9,167,905 B2 * | 10/2015 | Pajic | A47C 7/70 |
| 9,310,205 B2 * | 4/2016 | Xu | H04W 4/02 |
| 9,577,463 B2 | 2/2017 | McCoy et al. | |
| 9,654,179 B2 | 5/2017 | Shultz et al. | |
| 2004/0125493 A1 | 7/2004 | Shimotono et al. | |
| 2004/0141635 A1 | 7/2004 | Liang et al. | |
| 2004/0167367 A1 | 8/2004 | Beierle | |
| 2005/0034083 A1 | 2/2005 | Jaeger | |
| 2005/0127868 A1 | 6/2005 | Calhoon et al. | |
| 2005/0259033 A1 | 11/2005 | Levine | |
| 2005/0284405 A1 | 12/2005 | Pomakoy-Poole et al. | |
| 2006/0063540 A1 | 3/2006 | Beuck | |
| 2006/0080072 A1 | 4/2006 | Lachman et al. | |
| 2006/0154642 A1 | 7/2006 | Scannell, Jr. | |
| 2006/0224300 A1 | 10/2006 | Shioya et al. | |
| 2006/0242901 A1 | 11/2006 | Casimaty et al. | |
| 2007/0069687 A1 | 3/2007 | Suzuki | |
| 2007/0130893 A1 | 6/2007 | Davies | |
| 2007/0138272 A1 | 6/2007 | Saperstein et al. | |
| 2007/0138273 A1 | 6/2007 | Saperstein et al. | |
| 2007/0152479 A1 | 7/2007 | Howman et al. | |
| 2007/0243296 A1 | 10/2007 | Bourassa et al. | |
| 2008/0036610 A1 | 2/2008 | Hokuf et al. | |
| 2008/0120768 A1 | 5/2008 | Tsujimoto | |
| 2008/0173257 A1 | 7/2008 | Steiner et al. | |
| 2008/0189170 A1 | 8/2008 | Ramachandra | |
| 2008/0211641 A1 | 9/2008 | Murray et al. | |
| 2008/0229704 A1 | 9/2008 | Augustyniak et al. | |
| 2009/0040048 A1 | 2/2009 | Locker et al. | |
| 2009/0118869 A1 | 5/2009 | Cauchy et al. | |
| 2009/0203367 A1 | 8/2009 | Pamminger et al. | |
| 2010/0020169 A1 | 1/2010 | Jang et al. | |
| 2010/0119755 A1 | 5/2010 | Chung et al. | |
| 2010/0123778 A1 | 5/2010 | Hada | |
| 2010/0152545 A1 | 6/2010 | Ramsay et al. | |
| 2010/0295687 A1 | 11/2010 | Kuzniar et al. | |
| 2011/0005466 A1 | 1/2011 | Furth | |
| 2011/0031928 A1 | 2/2011 | Soar | |
| 2011/0068906 A1 | 3/2011 | Shafer et al. | |
| 2011/0068922 A1 | 3/2011 | Ross | |
| 2011/0105099 A1 | 5/2011 | Roll | |
| 2011/0156640 A1 | 6/2011 | Moshfeghi | |
| 2011/0270712 A1 | 11/2011 | Wood et al. | |
| 2012/0069051 A1 | 3/2012 | Hagbi et al. | |
| 2012/0099800 A1 | 4/2012 | Llano et al. | |
| 2012/0158297 A1 | 6/2012 | Kim et al. | |
| 2012/0184200 A1 | 7/2012 | Chutorash et al. | |
| 2012/0303939 A1 | 11/2012 | Cain et al. | |
| 2012/0319487 A1 | 12/2012 | Shah | |
| 2013/0027561 A1 | 1/2013 | Lee et al. | |
| 2013/0056929 A1 | 3/2013 | Rehkemper et al. | |
| 2013/0063304 A1 | 3/2013 | Almohsen | |
| 2013/0068942 A1 | 3/2013 | Verenchikov | |
| 2013/0093220 A1 | 4/2013 | Pajic | |
| 2013/0132434 A1 | 5/2013 | Scofield et al. | |
| 2013/0134923 A1 | 5/2013 | Smith et al. | |
| 2013/0141251 A1 | 6/2013 | Sims et al. | |
| 2013/0279409 A1 | 10/2013 | Dublin et al. | |
| 2013/0292976 A1 | 11/2013 | Kane | |
| 2013/0325940 A1 | 12/2013 | Foti | |
| 2014/0023060 A1 | 1/2014 | Apte et al. | |
| 2014/0025805 A1 | 1/2014 | Apte et al. | |
| 2014/0046802 A1 * | 2/2014 | Hosein | G01R 1/06711 705/26.61 |
| 2014/0058866 A1 | 2/2014 | Okadome | |
| 2014/0104046 A1 | 4/2014 | Howell | |
| 2014/0117921 A1 | 5/2014 | Suomela | |
| 2014/0118635 A1 | 5/2014 | Yang | |
| 2014/0148095 A1 | 5/2014 | Smith et al. | |
| 2014/0173439 A1 | 6/2014 | Gutierrez et al. | |
| 2014/0179463 A1 | 6/2014 | Giles et al. | |
| 2015/0039458 A1 | 2/2015 | Reid | |
| 2015/0348413 A1 | 12/2015 | Han et al. | |
| 2015/0349537 A1 | 12/2015 | Milne et al. | |
| 2015/0349572 A1 | 12/2015 | McCoy et al. | |
| 2015/0382144 A1 * | 12/2015 | Lopez | H04W 4/023 455/456.2 |
| 2016/0019515 A1 | 1/2016 | Milne et al. | |
| 2016/0019788 A1 | 1/2016 | Milne et al. | |
| 2016/0021491 A1 | 1/2016 | Milne et al. | |
| 2016/0021492 A1 | 1/2016 | Carlsson et al. | |
| 2016/0021493 A1 | 1/2016 | Milne et al. | |
| 2016/0021510 A1 | 1/2016 | Milne et al. | |
| 2016/0048861 A1 * | 2/2016 | Morgaine | G06Q 30/0207 705/14.16 |
| 2016/0049993 A1 | 2/2016 | McCoy et al. | |

FOREIGN PATENT DOCUMENTS

| | | |
|---|---|---|
| JP | 2005017465 | 1/2005 |
| JP | 2006279859 | 10/2006 |
| JP | 2013168883 | 8/2013 |
| KR | 20140030707 A | 3/2014 |
| WO | 2009130199 A1 | 10/2009 |
| WO | 2013105920 A2 | 7/2013 |

OTHER PUBLICATIONS

James R. Milne, Gregory Peter Carlsson, Frederick J. Zustak, "Applying Mesh Network to Pet Carriers", related U.S. Appl. No. 14/333,006, Final Office Action dated Oct. 28, 2015.

James R. Milne, Gregory Peter Carlsson, Frederick J. Zustak, "Applying Mesh Network to Pet Carriers", related U.S. Appl. No. 14/333,066, Applicant's response to Final Office Action filed Oct. 28, 2015.

James R. Milne, Gregory Peter Carlsson, Frederick J. Zustak, "Applying Mesh Network to Pet Carrier", applicants response to final office action filed Oct. 28, 2015 in related pending U.S. Appl. No. 14/333,006.

James R. Milne, Gregory Peter Carlsson, Frederick J. Zustak, "Applying Mesh Network to Pet Carrier", non-final office action dated Dec. 4, 2015 in related pending U.S. Appl. No. 14/333,006.

(56) References Cited

OTHER PUBLICATIONS

James R. Milne, Gregory Peter Carlsson, Frederick J. Zustak, "Applying Mesh Network to Pet Carrier", applicants response to non-final office action filed Dec. 10, 2015 in related pending U.S. Appl. No. 14/333,006.
James R. Milne, Gregory Peter Calrsson, Frederick J. Zustak, "Vehicle Ad Hoc Network (VANET)", related U.S. Appl. No. 14/332,900, Non-Final Office Action dated Jan. 14, 2016.
James R. Milne, Gregory Peter Calrsson, Frederick J. Zustak, "Vehicle Ad Hoc Network (VANET)", related U.S. Appl. No. 14/332,900, Applicant's response to Non-Final Office Action filed Jan. 15, 2016.
James R. Milne, Gregory Peter Carlsson, Frederick J. Zustak, "Applying Mesh Network to Luggage", related pending U.S. Appl. No. 14/332,919, non-final office action dated Jan. 20, 2016.
James R. Milne, Gregory Peter Carlsson, Frederick J. Zustak, "Applying Mesh Network to Luggage", related pending U.S. Appl. No. 14/332,919, filed Jul. 16, 2014.
James R. Milne, Gregory Peter Carlsson, Frederick J. Zustak, "Applying Mesh Network to Pet Carrier", related pending U.S. Appl. No. 14/333,006, filed Jul. 16, 2014.
James R. Milne, Gregory Peter Carlsson, Frederick J. Zustak, "Vehicle Ad Hoc Network (VANET)", related pending U.S. Appl. No. 14/332,900, filed Jul. 16, 2014.
James R. Milne, Gregory Peter Carlsson, Frederick J. Zustak, "Mesh Network Applied to Fixed Establishment with Movable Items Therein", related pending U.S. Appl. No. 14/332,836, filed Jul. 16, 2014.
Gregory Peter Carlsson, Frederick J. Zustak, James R. Milne, "Mesh Network Applied to Arena Events", related pending U.S. Appl. No. 14/332,953, filed Jul. 16, 2014.
James R. Milne, Gregory Peter Carlsson, Frederick J. Zustak, "Applying Mesh Network to Luggage", related U.S. Appl. No. 14/332,919, Applicant's response to Non-Final Office Action filed Feb. 11, 2016.
James R. Milne, Gregory Peter Carlsson, Frederick J. Zustak, "Applying Mesh Network to Pet Carriers", related U.S. Appl. No. 14/332,006, Final Office Action dated Feb. 22, 2016.
James R. Milne, Gregory Peter Carlsson, Frederick J. Zustak, "Applying Mesh Network to Pet Carriers", related U.S. Appl. No. 14/332,006, Applicant's response to Final Office Action filed Mar. 16, 2016.
James R. Milne, Gregory Peter Carlsson, Frederick J. Zustak, "Vehicle Ad Hoc Network (VANET)", related pending U.S. Appl. No. 15/149,562, filed May 9, 2016.
Shiro Sakata, "Technical Paper, Chapter 2 Ad-Hoc Network, fifth title mobile IP Ad-Hoc Network, fourth group mobile/wirelss, knowledge base, knowledge forest" Institute of Electronics, Information and Communication Engineers, Jun. 10, 2010 URL link http://www.ieice-hbkb.org/files/04/04gun_05hen_02.pdf.
James R. Milne, Gregory Peter Carlsson, Frederick J. Zustak, "Applying Mesh Network to Luggage", related U.S. Appl. No. 14/332,919, Final Office Action dated Jun. 3, 2016.
James R. Milne, Gregory Peter Carlsson, Frederick J. Zustak, "Applying Mesh Network to Luggage", related U.S. Appl. No. 14/332,919, Applicant's response to Final Office Action filed Jun. 14, 2016.
Charles McCoy, James R. Milne, True Xiong, "Portable Device to Portable Device Wireless Power Transfer Methods and Systems", related pending U.S. Appl. No. 14/290,409, non-final office action dated Apr. 19, 2016.
Gregory Peter Carlsson, Frederick J. Zustak, James R. Milne, "Mesh Network Applied to Arena Events", related U.S. Appl. No. 14/332,953, Non-Final Office Action dated Jun. 30, 2016.
Gregory Peter Carlsson, Frederick J. Zustak, James R. Milne, "Mesh Network Applied to Arena Events", related U.S. Appl. No. 14/332,953, Applicant's response to Non-Final Office Action filed Jun. 30, 2016.
James R. Milne, Gregory Peter Carlsson, Frederick J. Zustak, "Mesh Network Applied to Fixed Establishment with Movable Items Therein", related pending U.S. Appl. No. 14/332,836 non-final office action dated Jul. 25, 2016.
James R. Milne, Gregory Peter Carlsson, Frederick J. Zustak, "Mesh Network Applied to Fixed Establishment With Movable Items Therein", related U.S. Appl. No. 14/332,836, Applicant's response to Non-Final Office Action filed Aug. 19, 2016.
James R. Milne, Gregory Peter Carlsson, Frederick J. Zustak, "Applying Mesh Network to Pet Carriers", related U.S. Appl. No. 14/333,006, Examiner's Answer dated Oct. 19, 2016.
James R. Milne, Gregory Peter Carlsson, Frederick J. Zustak, "Applying Mesh Network to Pet Carriers", related U.S. Appl. No. 14/333,006, Reply Brief filed Oct. 21, 2016.
James R. Milne, Gregory Peter Carlsson, Frederick J. Zustak, "Mesh Network Applied to Fixed Establishment with Movable Items Therein", related U.S. Appl. No. 14/332,836, Non-Final Office Action dated Mar. 22, 2017.
James R. Milne, Gregory Peter Carlsson, Frederick J. Zustak, "Mesh Network Applied to Fixed Establishment with Movable Items Therein", related pending U.S. Appl. No. 14/332,836, applicant's response to non-final office action filed Mar. 27, 2017.
Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.
Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.
The Seventh ACM International Workshop on Vehicular Inter-NETworking (VANET 2010) in conjunction with ACM MobiCom 2010. Sep. 24, 2010.
Tao Zhang, Xian Chen, Russell Hsing, K. Dnaiel Wong, "VNTA sub-TC" IEEE Communications Society, printed from web Jun. 3, 2014, http://www.danielwireless.com/vnta/.
Reza Azimi, Gaurav Bhatia, Ragunathan (Raj) Rajkumar, Priyantha Mudalige, "Vehicular Networks for Collision Avoidance at Intersections" Society for Automotive Engineers (SAE) World Congress, Apr. 2011, Detroit, MI, USA.
Timo Kosch, Christian Adler, Stephan Eichler, Christopher Schroth, Markus Strassberger, "The Scalability problem of vehicular ad hoc networks and how to solve it", IEEE Wireless Communications Magazine 13, Oct. 2006, No. 5, S.6. http://www.alexandria.unisg.ch/Publikationen/30977.
Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.
Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).
J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.
Charles McCoy, James R. Milne, True Xiong, "Portable Device to Portable Drive Wireless Power Transfer Methods and Systems" file history of related pending U.S. Appl. No. 14/290,409, filed May 29, 2014.
James R. Milne, Charles McCoy, True Xiong, "Scalable Antenna System" file history of related pending U.S. Appl. No. 14/290,426, filed May 29, 2014.
Charles McCoy, James R. Milne, True Xiong, "Method and System for Use in Configuring Multiple Near Field Antenna Systems" file history of related pending U.S. Appl. No. 14/460,224, filed Aug. 14, 2014.
James R. Milne, Gregory Peter Carlsson, Frederick J. Zustak, "Applying Mesh Network to Pet Carriers", related U.S. Appl. No. 14/333,006, Non-Final Office Action dated Aug. 27, 2015.

(56) References Cited

OTHER PUBLICATIONS

James R. Milne, Gregory Peter Carlsson, Frederick J. Zustak, "Applying Mesh Network to Pet Carriers", related U.S. Appl. No. 14/333,006, Applicant's response to Non-Final Office Action filed Aug. 31, 2015.

James R. Milne, Gregory Peter Carlsson, Frederick J. Zustak, "Mesh Network applied to Fixed Establishment with Movable Items Therein", related U.S. Appl. No. 14/332,836, Final Office Action dated Jun. 21, 2017.

James R. Milne, Gregory Peter Carlsson, Frederic J. Zustak, "Mesh Network Applied to Fixed Establishment with Movable Items Therein", related pending U.S. Appl. No. 14/332,836 applicant's response to final office action filed Jul. 17, 2017.

Charles McCoy, James R. Milne, Tru Xiong, "Method and System for Use in Configuring Multiple Near Field Antenna Systems", related pending U.S. Appl. No. 14/460,224, non-final office action dated Apr. 19, 2017.

James R. Milne, Charles McCoy, True Xiong, "Scalable Antenna System", related U.S. Appl. No. 14/290,426, Non-Final Office Action dated Jul. 19, 2017.

James R. Milne, Gregory Peter Carlsson, Frederick J. Zustak, "Mesh Network Applied to Fixed Establishment with Movable Items Therein", related U.S. Appl. No. 14/332,836, Final Office Action dated Oct. 31, 2016.

James R. Milne, Gregory Peter Carlsson, Frederick J. Zustak, "Mesh Network Applied to Fixed Establishment with Movable Items Therein", related U.S. Appl. No. 14/332,836, Applicant's response to Final Office Action filed Nov. 15, 2016.

James R. Milne, Gergory Peter Carlsson, Frederick J. Zustak, "Applying Mesh Network to Pet Carriers", related pending U.S. Appl. No. 14/333,006, Decision on Appeal reversed dated Dec. 6, 2017.

\* cited by examiner

CONSUMER ELECTRONICS (CE) DEVICE AND RELATED METHOD FOR PROVIDING STADIUM SERVICES

I. FIELD OF THE INVENTION

The application relates generally to applying mesh networks to stadium services.

II. BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p, IEEE 802.11s, WAVE IEEE 1609, WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to stadium seats for the provision of various stadium services.

SUMMARY OF THE INVENTION

Present principles provide an automatic means for a fan to gain access to many useful amenities, information, and group functions such as seat confirmation, seat location, statistics and data about the teams playing, league data and statistics, to order snacks/food and have it delivered to the fan's seat, to order souvenirs, permit group functions, provide discounts to up-coming events, and provide for target marketing. By mesh networking a smart device to a stadium seat, the fan gains access to many features offered by the stadium.

Accordingly, an assembly includes arena seats and mesh network modules engaged with respective seats. Each network module includes a processor and is configured for accessing a computer readable storage medium to execute instructions thereon to configure the processor to establish communication with a fan consumer electronics (CE) device, and send to the CE device a message indicating a location of the respective seat.

In some embodiments, the instructions when executed by the processor configure the processor to establish wireless communication with at least one adjacent network module to establish a mesh network therewith. In example implementations, the instructions when executed by the processor may configure the processor to obtain an identification from the CE device, and based on the identification, send a message to the CE device including data indicating whether the CE device is associated with a correct seat.

If desired, the instructions when executed by the processor configure the processor to access a data store of arena amenities near the respective seat, and send to the CE device information on the arena amenities near the respective seat. The instructions when executed by the processor may configure the processor to receive an order from the CE device, relay the order through a stadium mesh network to an order fulfillment processor, and send a message to the CE device that the order has been sent.

In non-limiting examples, the instructions when executed by the processor configure the processor to send to the CE device a prompt to dock the CE device in a receptacle associated with the respective seat. The instructions when executed by the processor may, if desired, configure the processor to send to the CE device a prompt to connect and/or to remain connected to an arena mesh network.

In another aspect, a consumer electronics (CE) device includes a display, a wireless transceiver, a computer readable storage medium bearing instructions executable by a processor, and a processor. The processor is configured for accessing the computer readable storage medium to execute the instructions to configure the processor to present on the display a user interface (UI) indicating a location of the CE device, and a location of an arena seat associated with a user of the CE device.

In example embodiments of this latter aspect, the UI may include a map graphically showing the locations. If desired, the instructions when executed by the processor configure the processor to present on the display a message indicating whether a user of the CE device is in a correct seat. Also, if desired the instructions when executed by the processor can configure the processor to present on the display a prompt for a user to engage the CE device with a dock associated with the respective seat, and/or to present on the display a prompt to obtain information related to a live event in an arena in which the arena seat is located, and/or to present on the display a prompt to connect to a video feed of an event in an arena in which the arena seat is located.

In another aspect, a mesh network includes plural computerized node modules associated with respective arena seats and dynamically forming a mesh network which uploads information related to respective CE devices communicating with the node modules to a receiving network for downloading of information pertaining to amenities and an event in an arena in which the seats are located. The information is downloaded to at least one of the respective CE devices.

If there are any problems with seating arrangements, e.g., double booking, broken or dirty seat, etc., arena management/personnel can be contacted immediately for service or problem resolution. The mesh network can include stadium suites, including a node in a suite room as well as in the seats of the suite room so that access can be granted to the suite room to a person bearing a wireless device networked to identify itself to the suite node to unlock the suite room.

The details of the present invention, both as to its structure and operation, can be best understood in reference to the accompanying drawings, in which like reference numerals refer to like parts, and in which:

DETAILED DESCRIPTION

Figure 1:
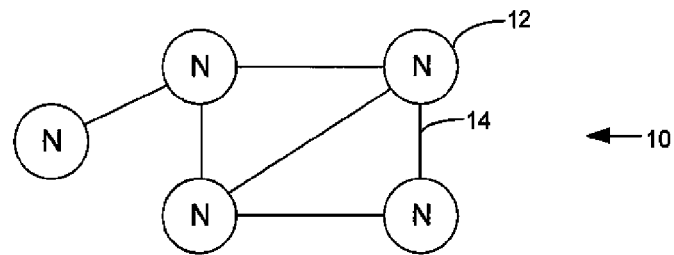
FIG. 1 is a block diagram of an example system including an example in accordance with present principles.

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the nodes 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component such as a specific stadium seat number, so that a network map or other network information user interface (UI) may be presented showing the mesh nodes along with an identification of the components, and not just the MAC addresses, with which the nodes are associated.

Figure 2:
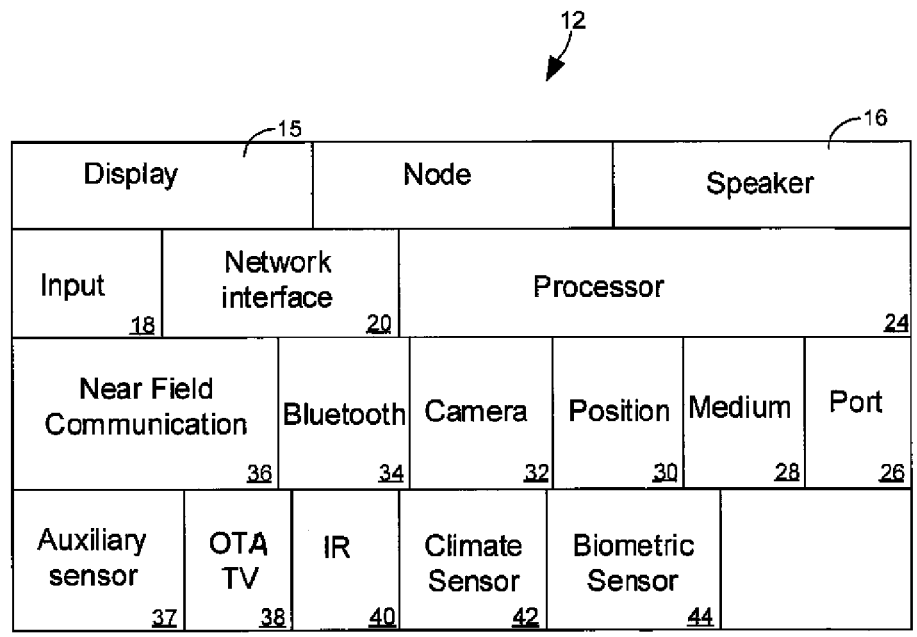
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the NODE 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
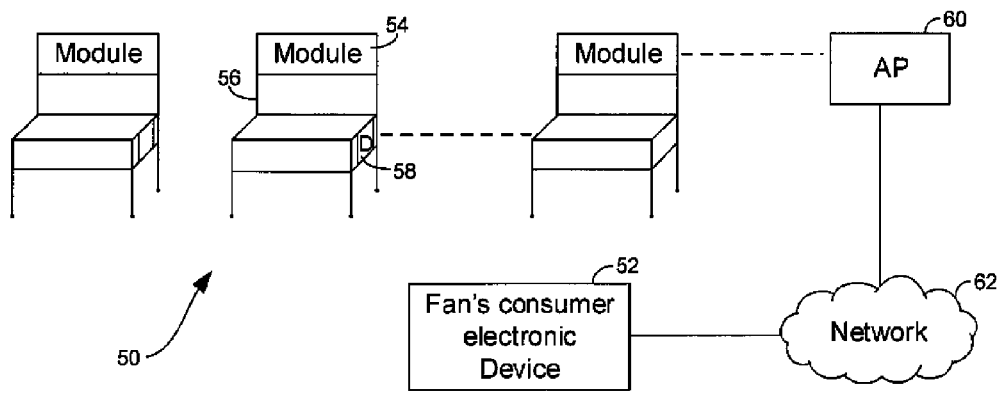
FIG. 3 is a schematic diagram of a stadium mesh network.

FIG. 3 shows an example mesh network 50 in which a fan's CE device (such as a smart phone) 52 is wirelessly networked with a stadium mesh network established by respective node modules 54 attached to respective stadium seats 56, it being understood that present principles apply to both indoor and outdoor event arenas including as used for school events (e.g., sports, academic, art fairs, concerts, etc.)

In some embodiments each seat 56 may include a dock 58 with which the CE device 52 can be engaged to establish wired communication with the respective node module 54 and/or to charge the CE device 52. The dock 58 can provide the CE device 52 with near field wireless power transfer, as well as near field wireless data transfer (e.g., NFC, transfer jet, et al).

If desired, only a subset of seats 56 may be provided with modules 54. While only a single fan CE device 52 is shown, many if not most fans may employ their CE devices in the network 50 as described below. One or more of the node modules 54 typically communicates with an access point (AP) 60 to connect to a wide(r) area networks 62, which the CE device 52 also may access.

With the above in mind and as further described below, when a person sits in his seat, he has the option to connect his smart device to the mesh network 50 of the stadium. Once connected, an activity is triggered to download an application to the smart device that will grant the user with many options to supplement his experience at the stadium. The stadium network may if desired gather information about the attendees and offer individual target marketing.

Figure 4:
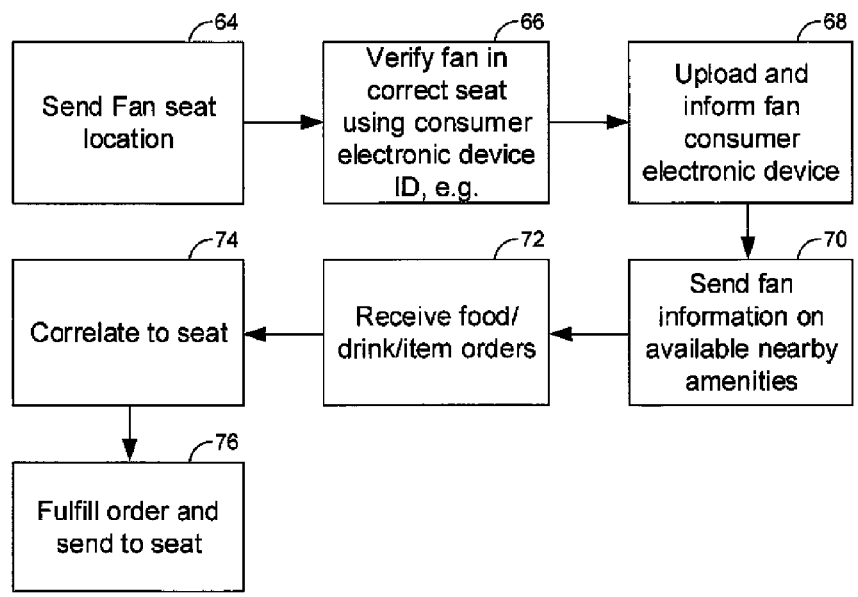
FIG. 4 is a flow chart of example non-limiting logic.
Figure 5:
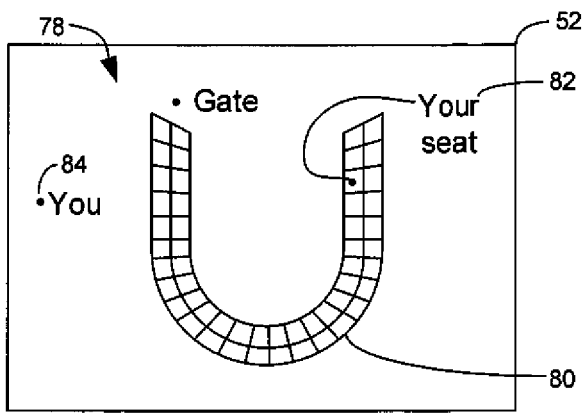
FIGS. 5-7 are screen shots of example user interfaces for the CE device of an occupant of a stadium seat.

Example logic that may be executed by the mesh network 50 is shown in FIG. 4. Commencing at block 64, the mesh network 50, e.g., through one or more of the network nodes or the AP 60 shown in FIG. 3, may send to a fan CE device a message indicating where a seat is located in the arena, with the seat typically having been pre-purchased by the fan. An example seat location indication is shown in FIG. 5 and described further below.

In one embodiment, the logic of block 64 may be executed as follows. The fan may make an electronic purchase of his or her seat using the CE device 52. As part of the purchase, the fan may select or be assigned a specific seat, and the arena computer that is part of the transaction records an identification associated with the fan's CE device such as but not limited to a media access control (MAC) address of the CE device. When the fan enters the arena, the CE device may automatically connect to the mesh network 50 within the arena, sending the mesh network its identification. Using this identification, the mesh network accesses the seat identification associated with the purchase transaction and sends an indication of the location of the seat in the arena to the CE device, as well as a view of the "field" from the seat location.

Proceeding to block 66, the mesh network 50 verifies whether a particular CE device is co-located in the correct seat, i.e., the seat which the mesh network as associated as being purchased by an owner of the CE device. This may be executed in one implementation by receiving the ID of a CE device when it docks with a seat and comparing the ID with the number of the seat that was purchased to determine if the correct seat has been docked with by the CE device. Or, in the absence of a dock, the node module 54 reporting the strongest signal strength from the CE device reporting its ID to the node module may be inferred to be the node module of the seat in which a person bearing the CE device has sat. The corresponding seat number is then compared to the purchased seat number to determine whether the person bearing the CE device has sat in the correct seat. The information from the CE device is uploaded at block 68 and the results of the comparison reported to the CE device, example instantiations of which are described further below.

Also, as indicated at block 70, once a CE device is in communication with a node module 54 the mesh network may send to the CE device, at block 70, information on the arena amenities nearest the respective seat. For example, the mesh network may access a map of arena amenities such as bathrooms, food vending stands, and souvenir stands and send the locations of the amenities nearest the seat in which the CE device is located to the CE device.

As described further below, the CE device may be employed to order food, drink, and other goods through the mesh network. Orders from the CE device may be received by the node module 54 of the seat in which the fan bearing the CE device is sitting at block 72. At block 74, the node module forwards the order to a fulfillment computer communicating with the mesh network along with the location of the seat associated with the node module, and the order is fulfilled at block 76 by alerting arena personnel of the order and the seat location to which to bring the ordered goods.

In addition, prompts from the mesh network for a user of the CE device to dock the device in the dock 58 of the seat, send to the CE device a prompt to dock the CE device in a receptacle associated with the respective seat, to connect and/or to remain connected to an arena mesh network, etc. may be sent through the node module of the mesh network that is communicating with the CE device.

Figure 6:
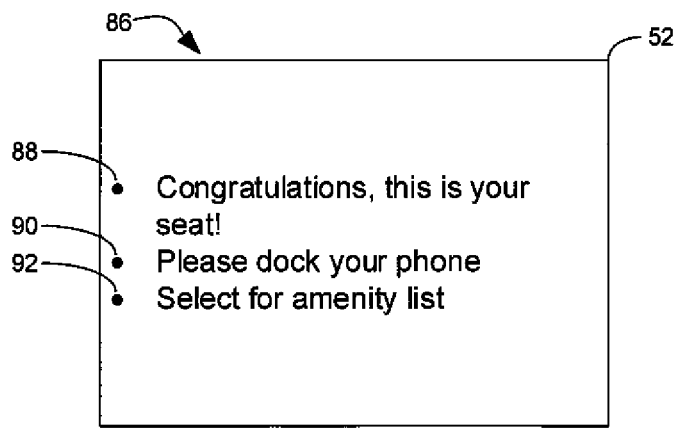
Figure 7:
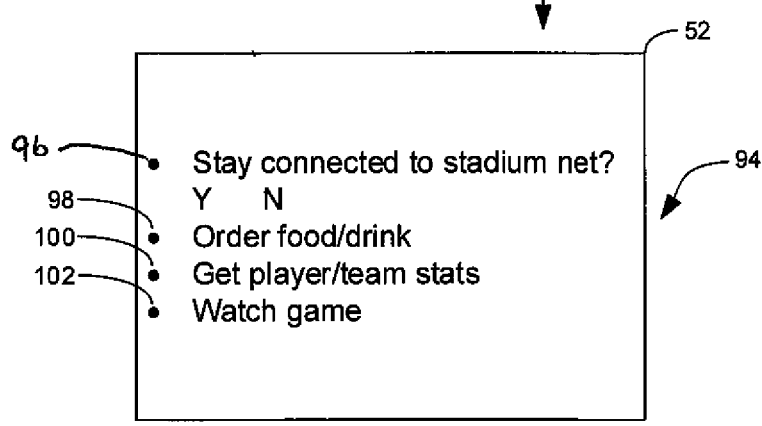

Indeed and now turning to FIGS. 5-7 for example UIs that may be presented on the CE device 52 according to data received from a node module of the mesh network, a UI 78 (FIG. 5) may be presented showing a map of the arena 80 along with the location 82 in the arena of the seat the fan has purchased as described above. In embodiments in which the CE device 52 uploads its location information (e.g., its GPS location) through, e.g., an AP 60 of the mesh network 50, the fan's location 84 (inferred to be the location of the CE device) may also be presented as shown, along with indications of gates and other ingress points for the fan's convenience in finding his way to his seat. In the example shown, the map of FIG. 5 graphically shows the locations and also includes alpha-numeric indications of the locations.

FIG. 6 shows an example UI 86 in which a message 88 is presented indicating whether the user (as inferred from the location of the CE device as described above) is in the correct seat. In the example shown, the fan has found the right seat. Also, a message 90 from the mesh network 50 may be presented on the UI prompt a user to engage the CE device with the dock 58 associated with the respective seat. Moreover, a prompt from the network may be presented on the CE device to obtain information related to a live event in an arena in which the arena seat is located. For example, a prompt 92 may be presented that can be selected to present a subsequent UI showing locations of amenities in the arena nearby the seat in which the fan is sitting.

Additional services can be afforded by the mesh network 50. In the example UI 94 of FIG. 7, a prompt 96 can be presented on the CE device that can be selected to connect to or remain connected with the mesh network 50. Also, a prompt 98 may be presented that can be selected to cause a food and drink ordering UI to be presented on the CE device, from which selections may be made by the fan and relayed through the network module with which the CE device communicates for fulfillment as described above. Similarly, a prompt 100 may be presented that can be selected to cause statistics related to the event in the arena to be downloaded, through the mesh network 50 is desired or a wide area network, to the CE device for presentation thereon. A prompt 102 may be presented on the CE device which is selected is relayed through the mesh network to connect the CE device to a video feed of the event in the arena.

It will be appreciated that while the APPLYING MESH NETWORK TO STADIUM SERVICES has been fully described in relation to one or more example embodiments, these are not intended to be limiting, and that various alternative arrangements may be used to implement the subject matter claimed herein.

What is claimed is:

1. Consumer electronics (CE) device, comprising:
   at least one audio and/or visual display;
   at least one wireless transceiver;
   at least one computer readable storage medium bearing instructions executable by a processor; and
   at least one processor configured for accessing the computer readable storage medium to execute the instructions, the instructions configured to cause the processor to:
   upload first location information of the CE device to a network;
   present on the display an indication indicating a current location of the CE device and a location of an arena seat assigned to a user of the CE device;
   upload second location information of the CE device;
   responsive to uploading second location information indicating that the CE device has arrived at the arena seat, prompt a user to engage the CE device with a dock associated with the arena seat, wherein the prompt is presented on the display; and
   responsive to engaging the CE device with the dock, receive power and/or information from the dock by the CE device.

2. The CE device of claim 1, wherein the instructions are executable to:
present on the display a map graphically showing the uploaded current location and the location of the arena seat.

3. The CE device of claim 2, wherein the instructions are configured to further cause the processor to:
present on the display a message indicating whether a user of the CE device is in a correct seat.

4. The CE device of claim 2, wherein the instructions are configured to further cause the processor to:
present on the display a prompt to connect to a video feed of an event in an arena in which the arena seat is located.

5. The CE device of claim 2, wherein the instructions are configured to further cause the processor to:
present on the display a prompt to obtain information related to a live event in an arena in which the arena seat is located.

6. An apparatus comprising:
at least one processor;
at least one computer memory that is not a transitory signal and that comprises instructions executable by at least one processor, the instructions configured to cause the at least one processor to:
upload first location information of consumer electronics (CE) device to a network;
present on an audio and/or visual display of the CE device an indication indicating the current location of the CE device and a location of an arena seat assigned to a user of the CE device;
upload second location information of the CE device;
responsive to uploading second location information indicating that the CE device has arrived at the arena seat, prompt a user to engage the CE device with a dock associated with the arena seat, wherein the prompt is presented on the display; and
responsive to engaging the CE device with the dock, receive power and/or information from the dock by the CE device.

7. The apparatus of claim 6, further comprising at least one wireless transceiver.

8. The apparatus of claim 6,
wherein the indication includes a map graphically showing the current location and the location of the arena seat.

9. The CE device of claim 2, wherein the instructions are configured to further cause the processor to:
present on the display a message indicating whether a user of the CE device is in a correct seat.

10. The apparatus of claim 6, wherein the instructions are executable to: present on the display a prompt to obtain information related to a live event in an arena in which the arena seat is located.

11. The apparatus of claim 6, wherein the instructions are executable to: present on the display a prompt to connect to a video feed of an event in an arena in which the arena seat is located.

12. A method comprising:
uploading, by at least one processor of a consumer electronics (CE) device, current location information of the CE device to a mesh network associated with an arena;
presenting, by the at least one processor of the CE device on an audio and/or visual display of the CE device, a user interface (UI) indicating the current location of the CE device and a location of an arena seat assigned to a user of the CE device;
uploading, by the at least one processor of the CE device, updated location information of the CE device;
responsive to uploading updated location information that indicates that the CE device has arrived at the arena seat, prompting, by the at least one processor of the CE device, a user to engage the CE device with a dock associated with the arena seat, wherein the prompt is presented on the display;
responsive to engaging the CE device with the dock, receiving power and/or information from the dock by the CE device.

13. The method of claim 12, wherein the UI includes a map graphically showing the uploaded current location and the location of the arena seat.

14. The method of claim 12, comprising: presenting on the display a message indicating whether a user of the CE device is in a correct seat.

15. The method of claim 12, comprising: presenting on the display a prompt to obtain information related to a live event in an arena in which the arena seat is located.

16. The method of claim 12, comprising: presenting on the display a prompt to connect to a video feed of an event in an arena in which the arena seat is located.

* * * * *